Sept. 19, 1961 G. VAN DER LELY ET AL 3,000,166
DEVICES FOR PICKING UP MATERIAL LYING ON THE GROUND
Filed Oct. 16, 1957 5 Sheets-Sheet 4
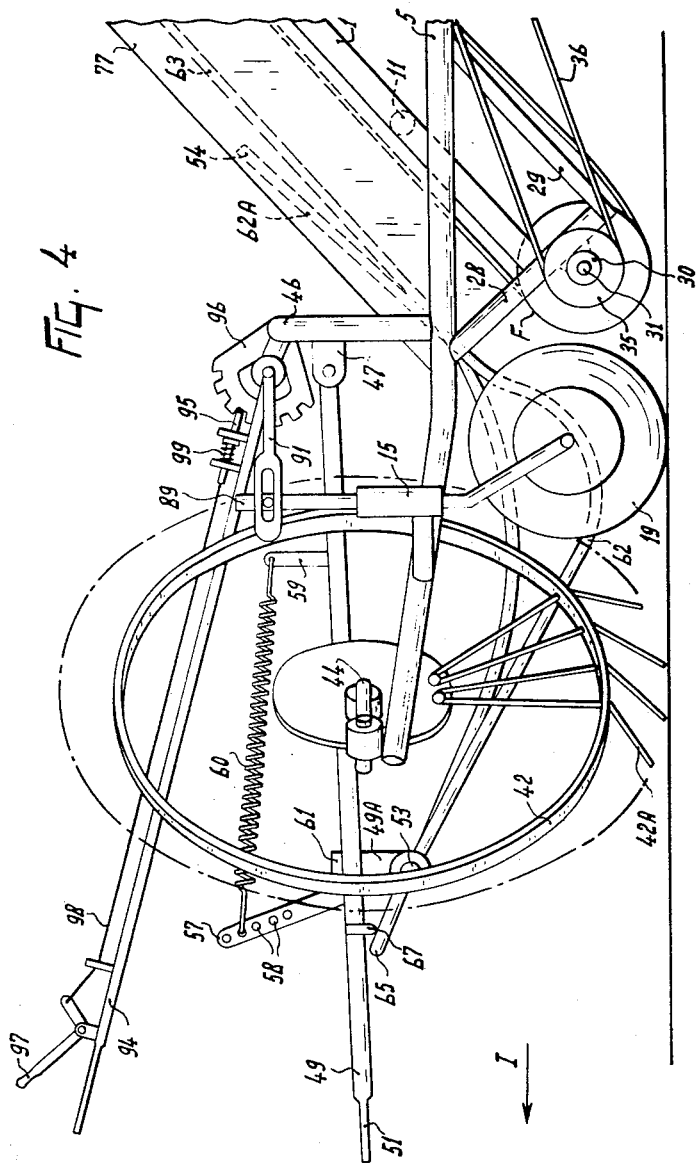

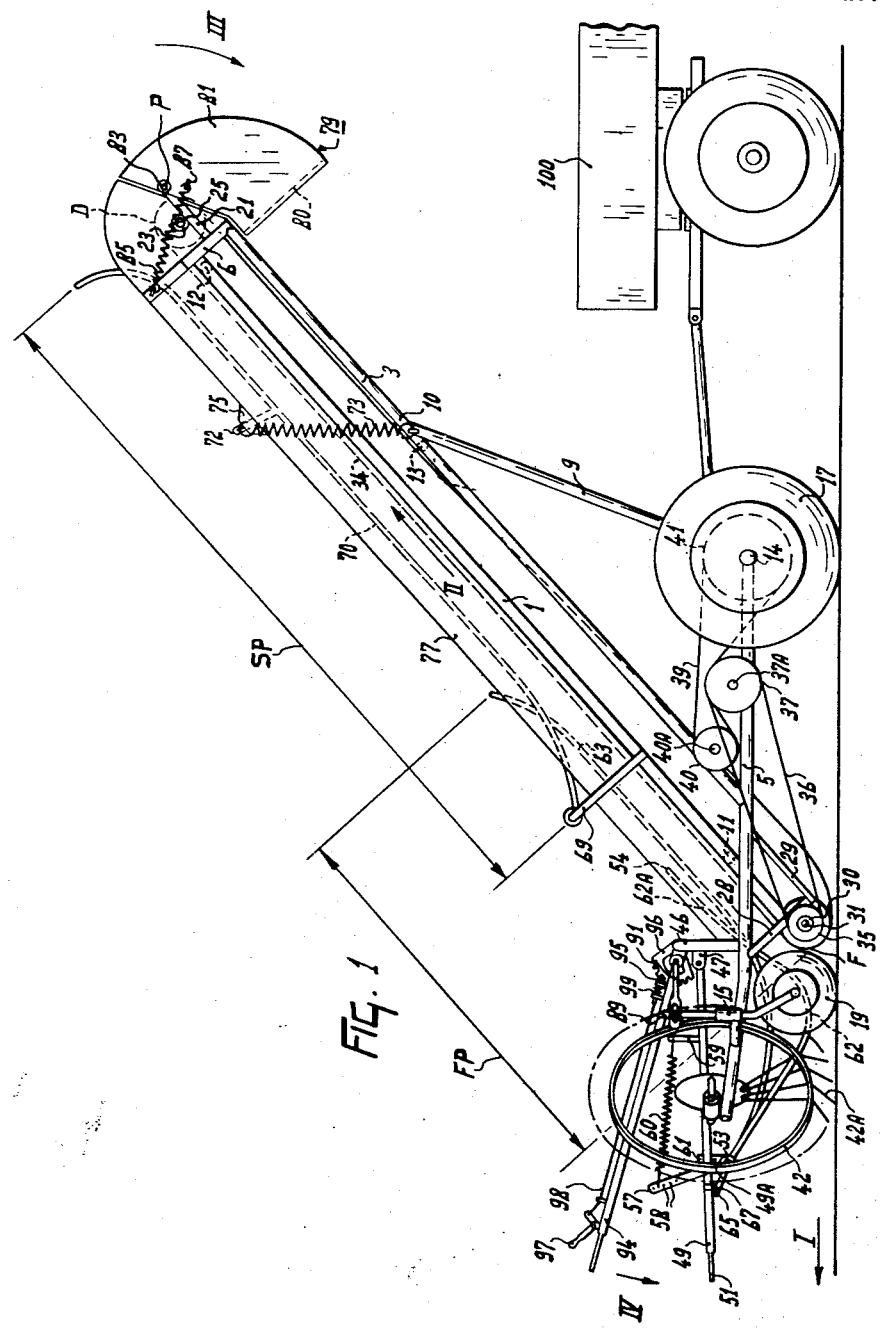

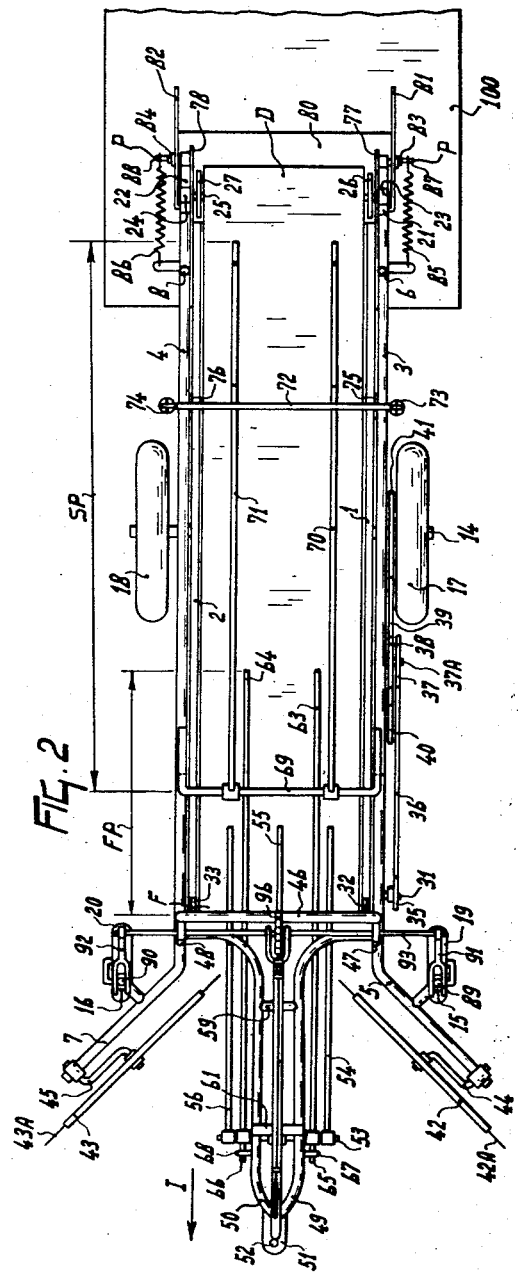

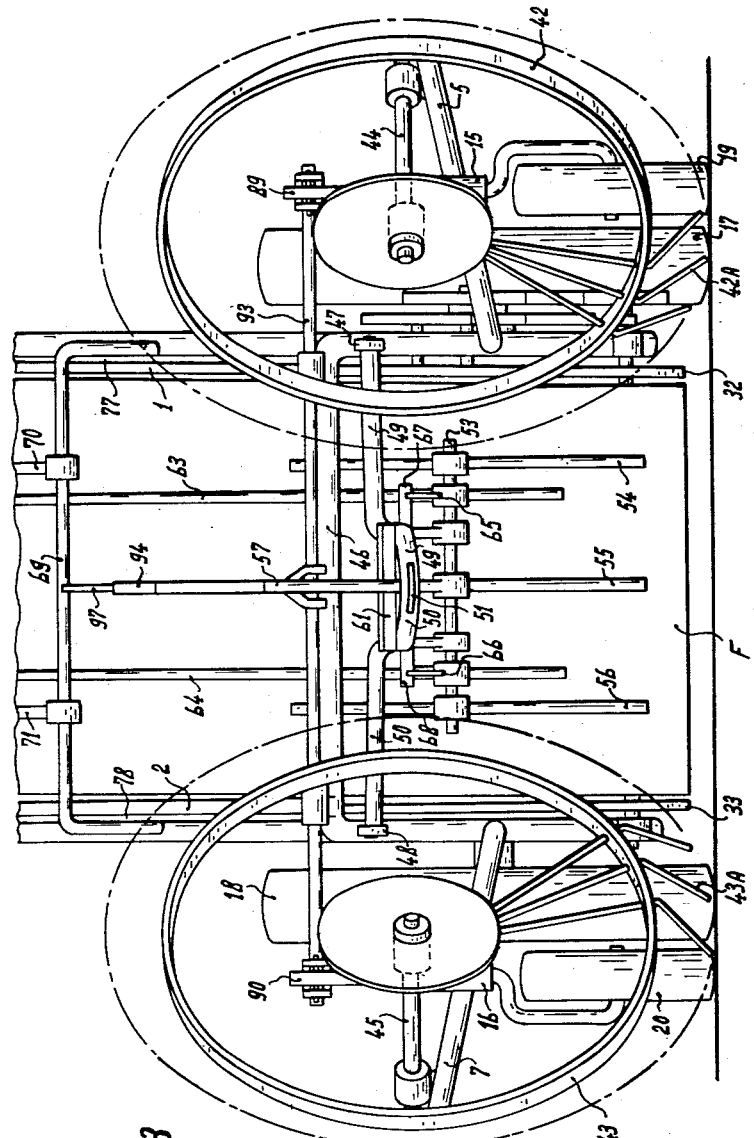

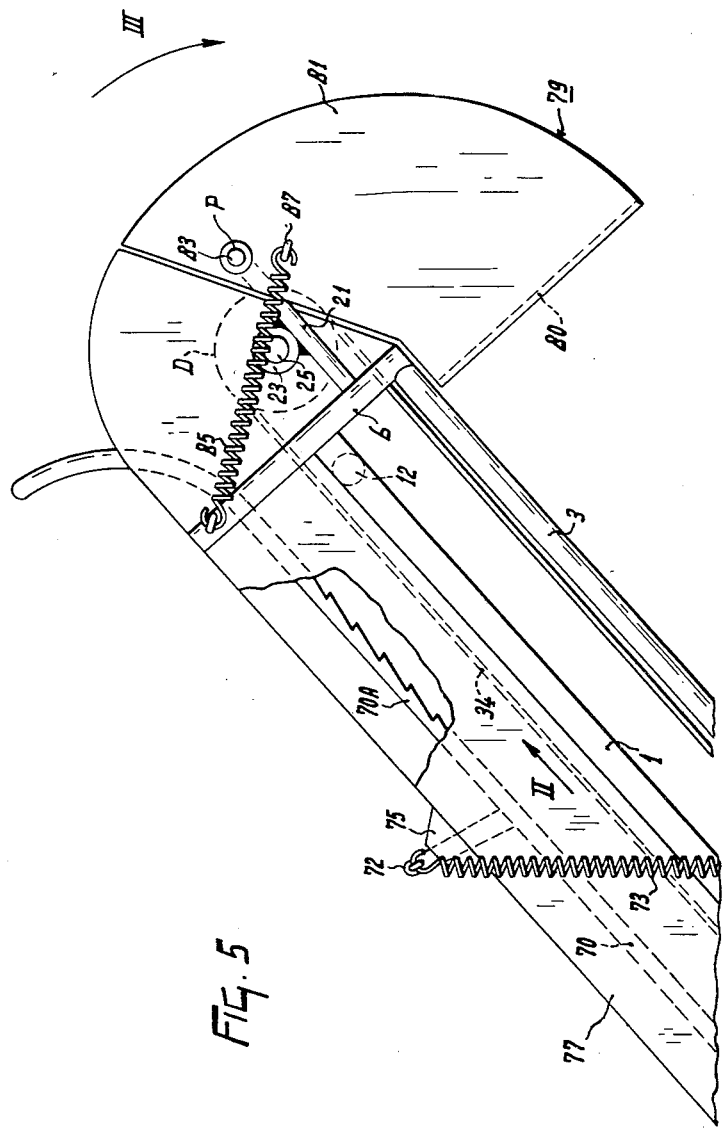

United States Patent Office 3,000,166
Patented Sept. 19, 1961

3,000,166
DEVICES FOR PICKING UP MATERIAL LYING
ON THE GROUND
Cornelis van der Lely and Ary van der Lely, Maasland,
Netherlands, assignors to C. van der Lely N.V., Maasland, Netherlands, a limited company of the Netherlands
Filed Oct. 16, 1957, Ser. No. 690,479
Claims priority, application Netherlands Oct. 20, 1956
7 Claims. (Cl. 56—345)

This invention relates to devices for picking up material lying on the ground, and more particularly to the type including conveyors.

Crop processing devices are known which include ground traversing conveyors supported at an angle relative to the ground traversed. The conveyors consist of endless belts or like elements which are actuated in known manner to lift the crop from the ground and convey it upwardly for deposit on a receptacle such as a cart or the like.

Known devices of this kind have exhibited the disadvantage that, particularly if the conveyor is at a large angle relative to the ground, the crop lying on the conveyor tends to roll down from the conveyor. An object of the invention is to obviate this disadvantage.

Additionally, known devices exhibit the further disadvantage that the conveyors tend to roll the material lying upon the ground forwardly, the movement of the associated belts adjacent the ground contributing to this deficiency. The invention also provides for avoiding this disadvantage.

To achieve its objectives, the invention contemplates providing conveyors with guide members. For example, a guide member may be arranged to extend longitudinally above a conveyor and the distance of the guide member from the conveyor can be made adaptable to the thickness of the crop layer lying thereupon. Several guide members can be provided in succession to obtain a more satisfactory adaptation to the thickness of the crop layer.

According to a feature of the invention, two guide members are advantageously arranged side by side along part of their lengths so that, at the transition of the crop from one guide member to the other, no accumulations are formed in the gaps between two successive guide members.

A further favorable feature of the invention is obtained by providing a guide member in front of the conveyor, and particularly a member having a curvature conforming to the lowermost extreme of the conveyor, the convex side of this curvature being directed towards the apex of the angle between the conveyor and the ground.

Especially at the beginning of an operation of picking up crop lying on the ground or at an interruption of a strip of crop lying on the ground, a conveyor tends to roll the crop forwardly instead of picking it up. By the provision of a curved guide member, as noted above, this is avoided and the material is efficiently picked up by the conveyor.

In further accordance with the invention, guide members can be supported in a pivotal manner, preferably at their forward and lowermost ends. This arrangement has the advantage that the free end of such a guide member can be lifted to accommodate accumulations of crop formed on the conveyor. Furthermore, these accumulations cannot slide downwardly since the guide member forms a wedge with the conveyor as a result of the fact that the pivoted end of the guide member occupies a fixed position.

A further feature consists of arranging at least two guide members of substantially the same shape side by side, so that throughout the width of the conveyor the crop can be readily controlled by the use of very narrow guide members.

According to a further aspect of the invention, a force can be exerted on a guide member to move the same towards the conveyor. This is particularly important when the conveyor is disposed in a very steep position, the weight of the guide member then being insufficient to hold the material on the conveyor. This additional force can be provided by means of springs, and can advantageously be rendered adjustable so that the device can be completely adapted to the characteristics of the crop to be picked up.

Two guide members of the same shape can be coupled to one another so as to be jointly rotatable about a shaft, provision being made of a lever or the like on which a force can be exerted. Thus a number of guide members can be urged by means of a single spring towards the conveyor and the force exerted on the guide members will be the same for each member.

Alternatively, guide members can be adapted to pivot independently of one another. Thus, each guide member can be adjusted readily to the thickness of the material layer located underneath it.

Other objects and advantages of the invention will be described in connection with a preferred embodiment thereof with reference to the accompanying drawing wherein:

FIGURE 1 is a side view of a device according to the invention;

FIGURE 2 is a plan view of the device shown in FIGURE 1;

FIGURE 3 is a front view on enlarged scale of the structure shown in FIGURE 1;

FIGURE 4 is an enlarged side view of the front and lowermost portion of the device, wherein the guide member is provided with a saw-tooth surface; and FIGURE 5 is an enlarged side view of the rear and uppermost portion of the device.

The device comprises a ground traversing frame consisting of parallel tubular struts 1, 2, 3 and 4. The struts 1 and 3 are connected to each other at their upper extremes by a tubular strut 6. In a similar manner, the tubular struts 2 and 4 are connected with one another by a tubular strut 8. The rearmost end of a tubular arm 5 is connected by means of a tubular strut 9 to the portion 10 of the strut 3. In a similar manner, the rearmost end of a tubular arm 7 is secured to the strut 4. The struts 1 and 3 are secured to the struts 2 and 4 by means of transverse beams 11, 12 and 13. The rearmost ends of the arms 5 and 7 are secured to one another by a shaft 14. At the diverging front ends of the arms 5 and 7, vertical bearings 15 and 16 are provided. The device is supported by running wheels 17 and 18, which are rotatably mounted at the ends of the shaft 14 and by running wheels 19 and 20 which are supported in the bearings 15 and 16. The struts 6 and 8 are provided with supports 21 and 22 to which are fixed bearings 23 and 24. A shaft 25 is rotatable in the bearings 23 and 24. The shaft 25 is provided with wheels 26 and 27.

To the lower side of the arm 5, by means of beams 28 and 29, is secured a bearing 30. In the bearing 30 and in a bearing similarly arranged on the lower side of the tube 7 is rotatably mounted a shaft 31. Wheels 32 and 33 are provided on the shaft 31. On the wheels 32, 33, 26 and 27 is arranged a conveyor, which is constituted in this embodiment by an endless conveyor belt 34 which is driven from the running wheel 17. For this purpose, there is mounted on the shaft 31 a sprocketed wheel 35 which is connected by means of a chain 36 with a sprocketed wheel 37 rotatable on a shaft 37a supported by a flange (not shown) on the arm 5. The wheel 37 is coaxially linked with a sprocketed wheel 38. On the upper side of the wheel 38 is engaged a chain 39 which further passes around sprocketed wheels 40 and 41. The wheel 41 is mounted on the shaft 14 and is adapted to be coupled or decoupled with or from the running wheel 17 by means of known pawl structures (not shown). The wheel 40 rotates on a shaft 40a supported by a flange (not shown) on the strut 3.

Rake wheels 42 and 43, provided with tines 42a and 43a, are secured to the front ends of the arms 5 and 7 by means of cranks 44 and 45. A V-shaped tube 46 is arranged in inverted position over the front and lowermost end F of the conveyor belt 34 and is connected with the tubes 5 and 7 at its downwardly extending ends. To the tube 46 are secured bearings 47 and 48 in which tubes 49 and 50 are rotatable. Tubes 49 and 50 extend forwardly and are coupled with one another at their front ends by means of a strip 51 which defines a hole 52. On the lower sides of the tubes 49 and 50, a shaft 53 is rotatably supported in bearings 49a and 50a (only the first of which is shown). To the shaft 53, guide members 54, 55 and 56 are rigidly connected. Near the shaft 53, a lever 57 is rigidly mounted on the guide member 55, this lever being provided with a series of holes 58. Intermediate the tubes 49 and 50 is secured a bowed strip 59 at the upper end of which is secured one end of a spring 60, the other end of which is hooked in one of the holes 58 of the lever 57. Intermediate the tubes 49 and 50 is further secured a transverse strip 61 which constitutes a stop for limiting the pivotal motion of the lever 57 so that a minimum distance between the guide members and the conveyor belt is insured.

All of the guide members 54, 55 and 56 have the same shape including an arcuate portion 62, the convex side of which is directed towards the obtuse angle formed between the conveyor belt and the ground and may be made of tubular or strip-shaped material. The portions 62a extend along and above the surfaces of the belt 34. Guide members 63 and 64 are being freely rotatable on the shaft 53 and extend a greater distance along the belt 34 (for example, along a first part FP) than do the members 54—56. On the front ends of the guide members 63 and 64 are provided extensions 65 and 66 which bear on stops 67 and 68 mounted on tubes 49 and 50, if little or no material is lying on the conveyor belt. The rearmost ends of the guide members 63 and 64 are curved upwardly so that these ends are spaced further from the conveyor belt 34 than the central parts of the guide members 63 and 64, which will contact the crop.

Over the conveyor belt 34, an inverted V-shaped tube 69 is provided for rotatably supporting guide members 70 and 71 which may be made of tubular or strip-shaped material. The guide members 70 and 71 are interconnected by means of a transverse beam 72 to the ends of which are secured springs 73 and 74 which are connected to the tubes 3 and 4, respectively. The springs 73 and 74 draw the guide members 70 and 71 towards the conveyor belt 34 and these guide members extend along a second part SP of the latter. A minimum distance between the guide members 70 and 71 and the conveyor belt 34 is insured since the beam 72 bears on stops 75 and 76 which are provided on side plates 77 and 78, respectively mounted on and above the tubes 1 and 2 on opposite sides of the conveyor belt 34.

At the rear and uppermost or discharge end D of the conveyor belt 34, there is mounted a discharge or screening hood 79 which consists of a bottom plate 80 and side walls 81 and 82. The screening hood 79 is rotatable about a pivot P constituted by pins 83 and 84 which are provided on the supports 21 and 22. Over-center spring 85 and 86, which are connected to the side walls of the conveyor and which engage pins 87 and 88 mounted on the side walls 81 and 82 of the screening hood 79, normally tend to urge the screening hood 79 in a direction III about the pins 83 and 84 so that the screening hood will be held in the position shown in FIGURE 1, in which the bottom plate 80 bears on the tubes 3 and 4.

The running wheels 19 and 20 are mounted on shafts 89 and 90 slidable in the bearings 15 and 16. The upper ends of the shafts 89 and 90 are connected with levers 91 and 92 which are interconnected by a shaft 93. To the shaft 93 is secured a lever 94. The shaft 93 can be turned by the movement of the lever 94 whereupon the shafts 89 and 90 slide in the bearings 15 and 16. The lever 94 can be locked in position by introducing a pin 95 into a slot of a toothed segment 96 which is rigidly secured to the tube 46. The pin 95, which is secured to the lever 94 near the shaft 93, can be actuated by means of a small lever 97 which is arranged near the handle of the lever 94. The lever 97 is connected with the pin 95 by means of a wire 98. The pin 95 is surrounded by a spring 99 which tends to urge the pin 95 into a recess of the segment 96. By depressing the lever 97, the pin 95 can be withdrawn from one of the slots of the segment 96 so that the lever 94 is rotatable about the shaft 93 to a different position.

The device described above operates as follows: With the device moving in the direction I as a result of a force exerted on the strip 51 and with the wheel 41 coupled with the running wheel 17, the conveying surface of the conveyor belt 34 moves in a direction indicated by the arrow II. Crop lying on the ground in front of the device is picked by by the conveyor belt 34 and is carried upwards and leaves the device at its top end via the screening hood 79, whereby the crop is loaded onto a receptacle or cart 100 which is connected to the rear of the device and drawn thereby.

The rake wheels 42 and 43, which are arranged in an oblique position relatively to the direction of movement I are rotated during the movement of the device. They displace the crop lying outside of the path of the conveyor belt towards the center of the device and thus the operative width of the device is increased.

The crop picked up from the ground normally tends to roll back from the conveyor belt. This backward rolling of the crop, which adversely affects the operation of the device, is avoided by the provision of the various guide members such as, for example, the members 55, 64 and 70. These guide members are movable, so that they are capable of accommodating various thicknesses of crop on the conveyor belt, and by their own weight, the guide members urge the material against the conveyor belt so that the material will not tend to roll back.

In order to increase the pressure of the guide members on the material, supplementary forces may be exerted on these members. This is indicated in the illustrated embodiment by means of springs, such as for example, springs 60, 73 and 74. If desired, these additional forces may be adjustable such as shown for the force exerted on the guide members 54, 55 and 56 for which the force exerted by the spring 60 is controlled by hooking the spring 60 into the different holes 58.

The illustrated embodiment shows the advantage of coupling a plurality of guide members to each other so that only one spring is required for these members. In certain cases it may, however, be advantageous to render adjacent guide members movable independently of one another so that the members are adaptable to the thickness of the material layer throughout the width of the conveyor belt. Thus, for example, parallel members 55 and 64 are independently pivotable.

In order to prevent the guide members from meeting the conveyor belt, it is desirable to provide stops for the guide members such, for example, the stop 61 for the guide members 54, 55 and 56, the stops 67 and 68 for the guide members 63 and 64 and the stops 65 and 76 for the guide members 70 and 71. These stops may be adjustable in a manner known per se so that the minimum distance between a guide member and the conveyor belt can be varied.

Furthermore, whereas at least two guide members have been shown in parallel of the various stations, it is possible to provide single guide members, preferably at the center of the conveyor.

At the beginning of the operation of picking up the material lying on the ground or at an interruption of a strip of material lying on the ground, the material tends to roll in front of the conveyor belt instead of moving up the conveyor. This is advantageously avoided by the provision of a guide member extending in front of the conveyor belt and with an arcuate configuration somewhat conforming to the profile of the lower end of the conveyor belt and having its convex side directed towards the obtuse angle between the conveyor belt and the ground.

The guide members are preferably rotatable about shafts lying to the front of and lower than the associated guide members. This has the advantage that, if an accumulation of crop is formed on the conveyor belt and a guide member is pivotally lifted, the crop cannot slide downwardly since the distance between the guide member and the conveyor belt decreases in the direction of the associated shaft.

What is claimed is:

1. Apparatus for picking up material lying on the ground comprising: a frame, a conveyor on said frame and inclined with respect to the ground for engaging the material and conveying the same in an upward direction, said conveyor having an end adjacent the ground and defining an obtuse angle therewith, at least two overlapping guide members pivotally connected to said frame at different distances from said end and extending along the conveyor in spaced relation thereto, said guide members having free extremities respectively positioned above said conveyor at different distances from said end of said conveyor, said guide members together extending over substantially all of the conveyor, and a further guide member pivoted on said frame and including an arcuate portion extending downwardly toward the apex of said angle.

2. Apparatus as claimed in claim 1 wherein said free-extremities curve outwardly from said conveyor.

3. Apparatus as claimed in claim 1 comprising means on said frame supporting two of the guide members for pivotal movement about a common axis.

4. Apparatus as claimed in claim 1 comprising running wheels and means coupling said wheels adjustably to said frame whereby the elevation of said end can be controlled.

5. Apparatus as claimed in claim 1 comprising raking wheels on said frame in front of said end, said raking wheels being in diverging relation.

6. Apparatus as claimed in claim 1, wherein the conveyor has an upper end, comprising a hood at said upper end, and pivot means connecting the hood to said frame so that the hood can be pivoted thereon.

7. Apparatus as claimed in claim 6 comprising a spring on the frame connected to the hood to urge the hood towards the receptacle.

References Cited in the file of this patent

UNITED STATES PATENTS

| | | |
|---|---|---|
| 805,997 | Puterbaugh | Nov. 28, 1905 |
| 957,437 | Mottert | May 10, 1910 |
| 1,035,485 | Sletto | Aug. 13, 1912 |
| 1,046,284 | Finnigan | Dec. 3, 1912 |
| 1,157,680 | Dain | Oct. 26, 1915 |
| 1,289,577 | Tollefson | Dec. 31, 1918 |
| 1,306,597 | Krogen | June 10, 1919 |
| 1,319,724 | Pelton | Oct. 28, 1919 |
| 1,394,812 | Determann | Oct. 25, 1921 |
| 1,807,357 | Vaughn | May 26, 1931 |
| 2,417,309 | Lisle et al. | Mar. 11, 1947 |
| 2,458,713 | Linderer | Jan. 11, 1949 |
| 2,661,585 | Hansen | Dec. 8, 1953 |
| 2,699,031 | MacDonald | Jan. 11, 1955 |
| 2,731,782 | Mason | Jan. 24, 1956 |
| 2,766,576 | Van Der Lely | Oct. 16, 1956 |
| 2,833,410 | Sisulak et al. | May 6, 1958 |

FOREIGN PATENTS

| | | |
|---|---|---|
| 274,682 | Great Britain | July 28, 1927 |